Patented Dec. 8, 1925.

1,565,237

UNITED STATES PATENT OFFICE.

ALBRECHT SCHMIDT, ADOLF STEINDORFF, AND ALFRED FLUSS, OF HOCHST-ON-MAIN, AND OTTO SCHAFFRATH, OF LEIPZIG, GERMANY, ASSIGNORS TO FARBWERKE VORM. MEISTER LUCIUS & BRÜNING, OF HOCHST-ON-MAIN, GERMANY, A CORPORATION OF GERMANY.

PROCESS FOR TREATING SEED GRAIN.

No Drawing. Application filed April 7, 1923. Serial No. 630,592.

To all whom it may concern:

Be it known that we, ALBRECHT SCHMIDT, ADOLF STEINDORFF, ALFRED FLUSS, and OTTO SCHAFFRATH, citizens of Germany, residing at Hochst-on-Main, and Leipzig, Germany, respectively, have invented certain new and useful Improvements in a Process for Treating Seed Grain, of which the following is a specification, and for which applications for patents have been filed in Germany on Dec. 15, 1919, Sept. 10, 1920, Dec. 23, 1920, Jan. 3, 1921, Jan 6, 1921, and Aug. 17, 1921.

Seeds, before they are sown, should be treated in order to destroy any noxious parasites adhering thereto. The substances hitherto used for this purpose mostly exercise an injurious effect on the germinative faculty of the seeds and the object of our present invention is to provide agents which not only prevent this injurious influence of fungicide agents but which also have a remarkably favorable effect upon the germinative faculty of seeds, and besides possess themselves excellent fungicidal properties. We have found that organic arsenic compounds, including those which are solid at ordinary temperature as well as those which are liquid and those which are gaseous at ordinary temperature are agents of this kind.

The organic arsenic compounds not only prevent the injurious effects of fungicide agents upon the germinative faculty of seeds but they also stimulate the germinative faculty of the seeds and possess, besides, excellent fungicidal properties.

We will name hereinafter some organic arsenic compounds which are well suited for the said purpose, but we expressly state that our invention is not limited to the compounds specified, that we only cite them as examples out of the great number of suitable compounds in order to illustrate the invention. Examples of such compounds are the following:

Phenyl arsinic acid, salt solutions of diaminodihydroxyarsenobenzene or other arsenobenzene compounds, diphenylarsineoxide, phenylarsine oxide and its substitution products and homologs, mono- or dimethylarsine chloride, mono- or diethylarsine chloride, and the corresponding oxides, dimethylarsinecyanide, phenylarsine dichloride, diphenylarsinechloride, and diphenylarsinecyanide.

The treatment with the arsenic compounds may be combined with a treatment with a fungicide substance, thus for instance, an arsenic compound may be mixed with a fungicidal copper compound (copper compounds are well known fungicide agents) or there may be used a mixture of an arsenic compound and a fungicidal mercury compound (mercury compounds also are known fungicide agents).

The organic arsenic compounds may be applied in any suitable way, for instance by dusting either alone or in combination with other fungicide agents or indifferent materials or both or by immersing the seeds for some time in an aqueous solution containing a dissolved arsenic compound or the seeds may be sprinkled with such a solution. When using volatile arsenic compounds their vapors may be caused to act upon the seeds for a short time at an elevated temperature or for a longer time at a lower temperature. The volatile arsenic compound may be combined with another easily volatile chemical substance which dissolves the arsenic compound and thus increases its volatility. The volatile arsenic compound may be treated with air and the resulting gas carrying a small quantity of the arsenic compound may be brought into contact with the seeds in a screw conveyor or any other suitable apparatus. For instance, the gas current carrying the arsenic compound may be brought into contact with a stream of seed grain flowing from a silo. Finally the arsenic compound may be dissolved in an indifferent solvent and the resulting solution sprinkled upon the seeds or evaporated and the resulting vapors brought into contact with the seeds.

The following examples of recipes of suitable treating solutions illustrate the invention:

1. Equal parts of a 0.2% solution of the dihydrochloride of diaminodihydroxyarsenobenzene in water and a .2% aqueous solution of copper sulfate are mixed and this solution may be used directly for treating seeds, for instance by immersion, the duration of the treatment lasting for one hour.

2. A .25% solution of a mixture of 15 parts of mercuric chloride, 5 parts of aminophenylarsine oxide and 80 parts of a neutral indifferent diluent, such as for instance sodium sulfate may be used for treating seeds, for instance by the immersion process, the treatment lasting for one-half hour.

What we claim is:

1. Process of treating seeds which comprises applying thereto an organic arsenic compound.

2. Process of treating seeds which comprises applying thereto an organic arsenic compound and another fungicidal substance.

In testimony whereof, we affix our signatures.

ALBRECHT SCHMIDT.
ADOLF STEINDORFF.
ALFRED FLUSS.
OTTO SCHAFFRATH.